(12) United States Patent
Rrumbullaku et al.

(10) Patent No.: US 11,499,350 B2
(45) Date of Patent: Nov. 15, 2022

(54) INTEGRATED DOOR RELEASE AND PRESENT SYSTEM

(71) Applicant: GM Global Technology Operations LLC, Detroit, MI (US)

(72) Inventors: Besi Rrumbullaku, Rochester, MI (US); Jeffrey L. Konchan, Romeo, MI (US); Jeffrey R. Nowicki, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 946 days.

(21) Appl. No.: 16/276,229

(22) Filed: Feb. 14, 2019

(65) Prior Publication Data

US 2020/0263456 A1 Aug. 20, 2020

(51) Int. Cl.
*E05B 81/12* (2014.01)
*E05B 79/20* (2014.01)
(Continued)

(52) U.S. Cl.
CPC .............. *E05B 81/13* (2013.01); *B60J 5/04* (2013.01); *B60J 5/101* (2013.01); *B62D 25/105* (2013.01);
(Continued)

(58) Field of Classification Search
CPC .......... E05B 81/00; E05B 81/12; E05B 81/13; E05B 81/32; E05B 81/34; E05B 81/36; E05B 81/38; E05B 81/56; E05B 81/78; E05B 79/00; E05B 79/10; E05B 79/20; E05F 15/00; E05F 15/60; E05F 15/603; E05F 15/605; E05F 15/608; E05F 15/611; E05F 15/614; B60J 5/00; B60J 5/04; B60J 5/10; B60J 5/101; B62D 25/00; B62D 25/125; E05Y 2900/00; E05Y 2900/531;
(Continued)

(56) References Cited

U.S. PATENT DOCUMENTS

| 2018/0051502 A1* | 2/2018 | Roos | E05B 81/14 |
| 2018/0179788 A1* | 6/2018 | Oxley | E05B 81/13 |
| 2019/0153768 A1* | 5/2019 | Termine | E05F 15/622 |

FOREIGN PATENT DOCUMENTS

| CN | 1847060 A | 10/2006 |
| CN | 107687299 A | 2/2018 |

(Continued)

*Primary Examiner* — Nathan Cumar
(74) *Attorney, Agent, or Firm* — Quinn IP Law

(57) ABSTRACT

A system is used to control access into a vehicle having a vehicle body defining a vehicle interior, a vehicle exterior, and an access opening. The vehicle also has an access door for selectively covering and uncovering at least a portion of the access opening. The system includes a latch configured to selectively fasten the door to the vehicle body and release the door therefrom. The system also includes a cable configured to operate the latch and thereby release the door from the vehicle body. The system additionally includes a door presenter configured to shift the door away from the vehicle body. The system also includes a mechanism configured to sequentially actuate the cable and the door presenter. The system further includes an electric motor configured to power the mechanism such that the door is shifted away from the vehicle body by the door presenter after the door is released.

18 Claims, 6 Drawing Sheets

(51) Int. Cl.
*E05F 15/60* (2015.01)
*E05B 81/36* (2014.01)
*E05B 81/78* (2014.01)
*B60J 5/10* (2006.01)
*B62D 25/10* (2006.01)
*B60J 5/04* (2006.01)

(52) U.S. Cl.
CPC .............. *E05B 79/20* (2013.01); *E05B 81/36* (2013.01); *E05B 81/78* (2013.01); *E05F 15/60* (2015.01); *E05Y 2900/531* (2013.01); *E05Y 2900/546* (2013.01); *E05Y 2900/548* (2013.01)

(58) Field of Classification Search
CPC ......... E05Y 2900/532; E05Y 2900/546; E05Y 2900/548
USPC .......................................................... 49/280
See application file for complete search history.

(56) References Cited

FOREIGN PATENT DOCUMENTS

| CN | 107849876 A | 3/2018 |
| CN | 108952375 A | 12/2018 |
| GB | 2304801 A | 3/1997 |

\* cited by examiner

INTEGRATED DOOR RELEASE AND PRESENT SYSTEM

INTRODUCTION

The present disclosure is drawn to an integrated system for release and presenting of a vehicle's door.

A typical vehicle has at least one side door to provide access for vehicle occupants to the vehicle's interior. Generally, such side doors are either hinged to swing-out relative to the vehicle body or are configured to slide relative thereto. Such a side door typically has a latch mechanism for maintaining the door in a closed state until access into or egress from the vehicle is required. The door latch mechanism is typically actuated by an outside door handle to gain access to the interior of the vehicle and by an interior door handle to permit the occupant to exit the vehicle interior.

Additionally, vehicles frequently have enclosed cargo areas that are positioned either at the front or at the rear end of the vehicle body. The design of such cargo enclosures typically includes a hinged cargo door, such as a deck-lid or a tailgate for security and convenient access. Generally, similar to latch mechanisms of the side doors, cargo enclosure doors employ latch mechanisms for maintaining the enclosure in a closed state until access thereto is required. In modern vehicles, latch mechanisms for both the side doors and cargo doors are frequently power actuated.

SUMMARY

A system is used to control access into a vehicle having a vehicle body defining a vehicle interior, a vehicle exterior, and an access opening. The vehicle also has an access door for selectively covering and uncovering at least a portion of the access opening. The system includes a latch configured to selectively fasten the access door to the vehicle body and release the access door therefrom. The system also includes a cable configured to operate the latch and thereby release the access door from the vehicle body. The system additionally includes a door presenter configured to shift the access door away from the vehicle body. The system also includes a mechanism configured to sequentially actuate the cable and the door presenter. The system further includes an electric motor configured to power the mechanism such that the access door is shifted away from the vehicle body by the door presenter after the access door is released.

The system may also include an energy storage device configured to generate electrical power, and may also include a release switch in electrical communication with the latch and the energy storage device and configured to activate the electric motor.

The system may additionally include an electronic controller in operative communication with the release switch, the electric motor, and the energy storage device, and configured to regulate operation of the electric motor in response to actuation of the release switch.

The mechanism may include a first lever and a second lever configured to swing about a common pivot defined by a pivot shaft. The first lever may be in meshed connection with the electric motor and configured to actuate the door presenter, and the second lever may be configured to actuate the cable.

The mechanism may also include an elastic element configured to preload the first lever against the second lever and permit independent motion of the first lever relative to the second lever after the release of the latch.

The elastic element may be a torsion spring centered on the pivot shaft and configured to permit the first lever to actuate the door presenter after the release of the latch by the second lever.

The mechanism may additionally include a stop feature configured to limit travel of the second lever after the release of the latch.

The access door may include a door hem having an operator contact pad providing a surface for pulling the access door open.

Each of the latch, the cable, the door presenter, the mechanism, and the electric motor may be arranged on the access door.

The access opening may be either a side entry configured to provide access to the vehicle interior or an opening to a cargo area.

A vehicle employing the above-described system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
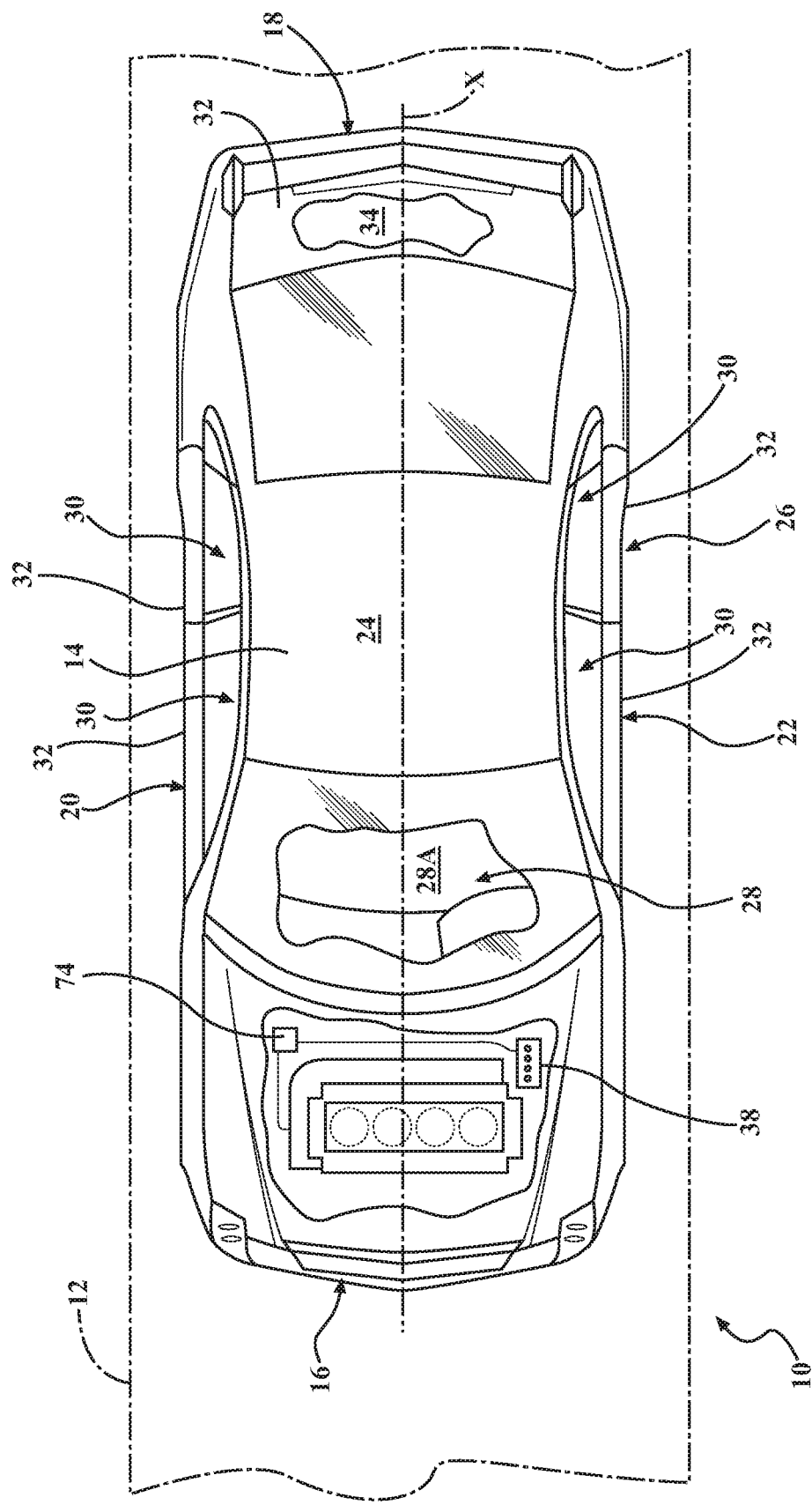
FIG. 1 is a schematic top view of a vehicle having a passenger compartment and a cargo enclosure with respective access doors according to the present disclosure and having a system for controlling access into the vehicle.

Referring to the drawings, wherein like reference numbers refer to like components, FIG. 1 shows a schematic view of a motor vehicle 10 positioned relative to a road surface 12. The vehicle 10 includes a vehicle body 14. The vehicle body 14 generally defines six body sides. The six body sides include a first body end or front end 16, an opposing second body end or rear end 18, a first lateral body side or left side 20, a second lateral body side or right side 22, a top body portion 24, which may include a vehicle roof, and an underbody portion (not shown) generally facing the road surface 12. The left side 20 and right side 22 are disposed generally parallel to each other and with respect to a virtual longitudinal axis X of the vehicle 10, and span the distance between the front end 16 and the rear end 18.

The body sides 16, 18, 20, 22, 24, together with the underbody portion define a vehicle exterior 26. The body 14 also defines a vehicle interior 28 that includes a passenger compartment 28A. The passenger compartment 28A is adapted to accommodate vehicle passengers and their belongings. As shown in FIG. 1, the vehicle 10 also includes at least one access opening 30 that is defined by the body 14 and provides access to the vehicle interior 28. As shown, the vehicle body 14 defines five individual access openings 30. The vehicle 10 also includes a number of access doors 32, one door for each of the access openings 30. Accordingly, each access door 32 is configured to selectively cover and uncover at least a portion of the respective access opening 30 in order to control passage between the vehicle exterior 26 and the vehicle interior 28. As shown, four of the access openings are side entries configured to provide access to the passenger compartment 28A, while the fifth opening provides access into a cargo enclosure 34. A respective access door 32 is provided to selectively cover and uncover at least a portion of the access opening 30 into the cargo enclosure 34.

Figure 2:
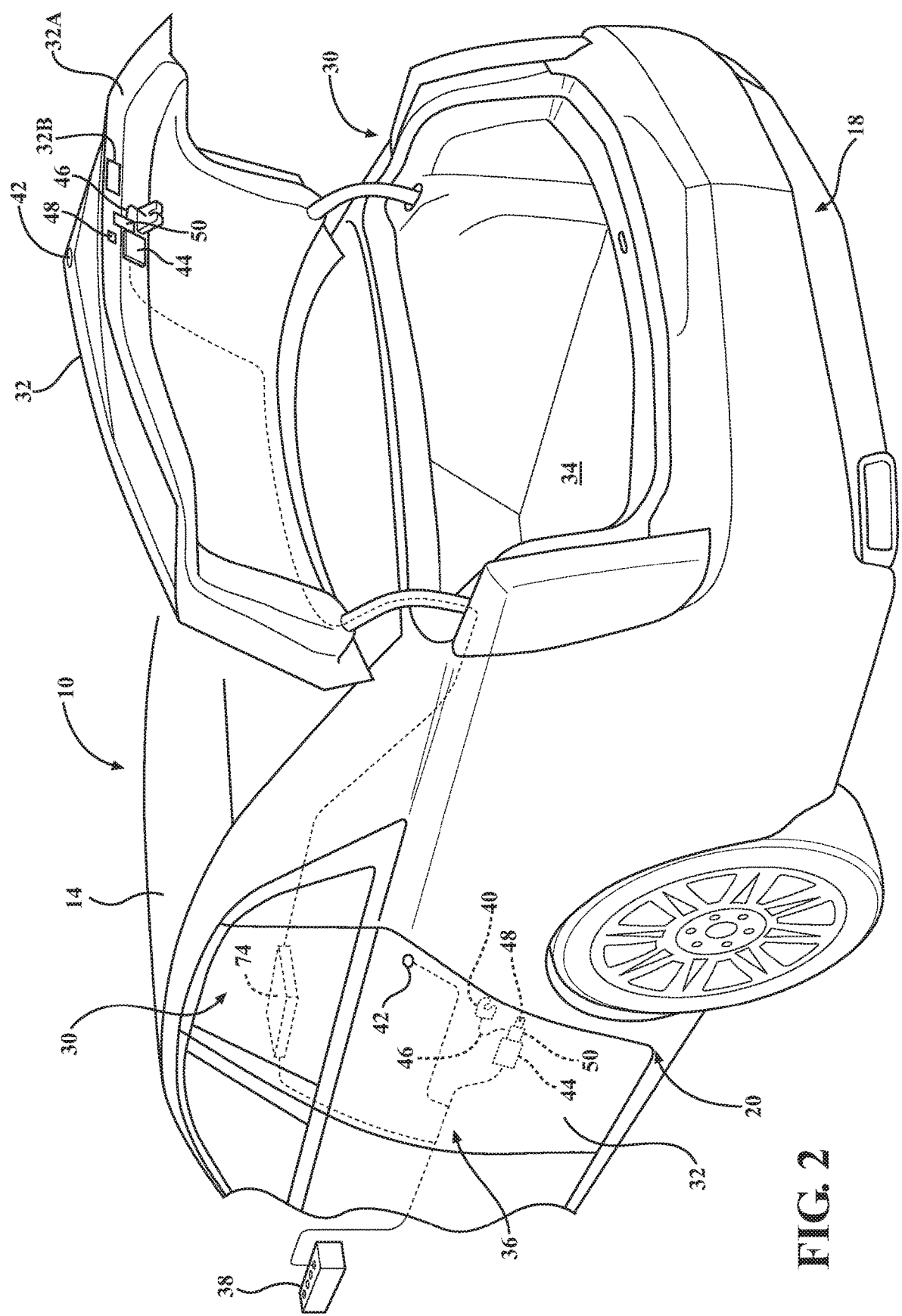
FIG. 2 is a partial perspective rear view of an example vehicle having the system for controlling access thereto, illustrating a three-box sedan body style having a fully-enclosed trunk and a deck lid for covering thereof.
Figure 3:
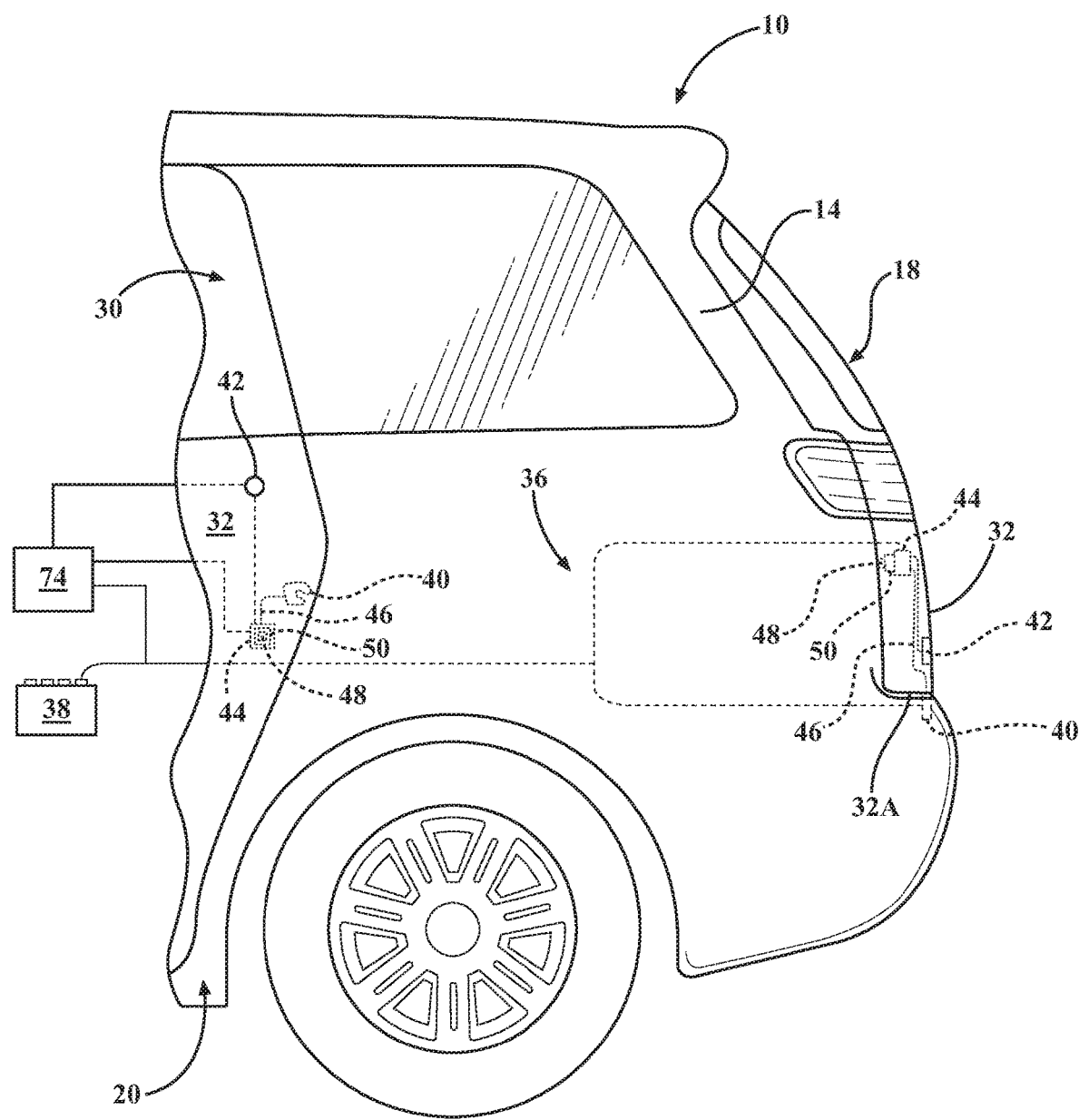
FIG. 3 is a partial rear view of an alternative embodiment of the vehicle having the system for controlling access thereto, illustrating an example of a hatchback body style having a partially-enclosed trunk and a tailgate for covering thereof.

The cargo enclosure 34 may be configured as a separate compartment, such as a fully-enclosed trunk, for instance in a traditional three-box sedan body style, while the respective access door 32 may be configured as a hinged deck-lid, as shown in FIG. 2. The access door 32 may also be configured as a tailgate (shown in FIG. 3) for a fully or partially-enclosed trunk, wherein at least one side of the trunk is open to the passenger compartment 28A. As shown, the tailgate-type of the access door 32 is hinged at the rear end 18 of the vehicle body 14 for substantially vertical pivotable movement, such as a liftgate. Additionally, the access door 32 may be configured as a tailgate hinged to the rear end 18 of the vehicle body 14 for substantially horizontal pivotable movement, such as a swing-out door (not shown). Although the cargo enclosure 34 is primarily described and shown throughout the Figures as being arranged at the rear 18 of the vehicle body 14, such a cargo enclosure may also be arranged proximate the front end 16. Such a front-positioned cargo enclosure 34 (not shown) may, for example, be used in a rear-engine or a mid-engine vehicle. The disclosed tailgate is of the type that is frequently used for access to the interiors and storage compartments in vans, station wagons, and sport utility vehicles (SUVs).

Figure 4:
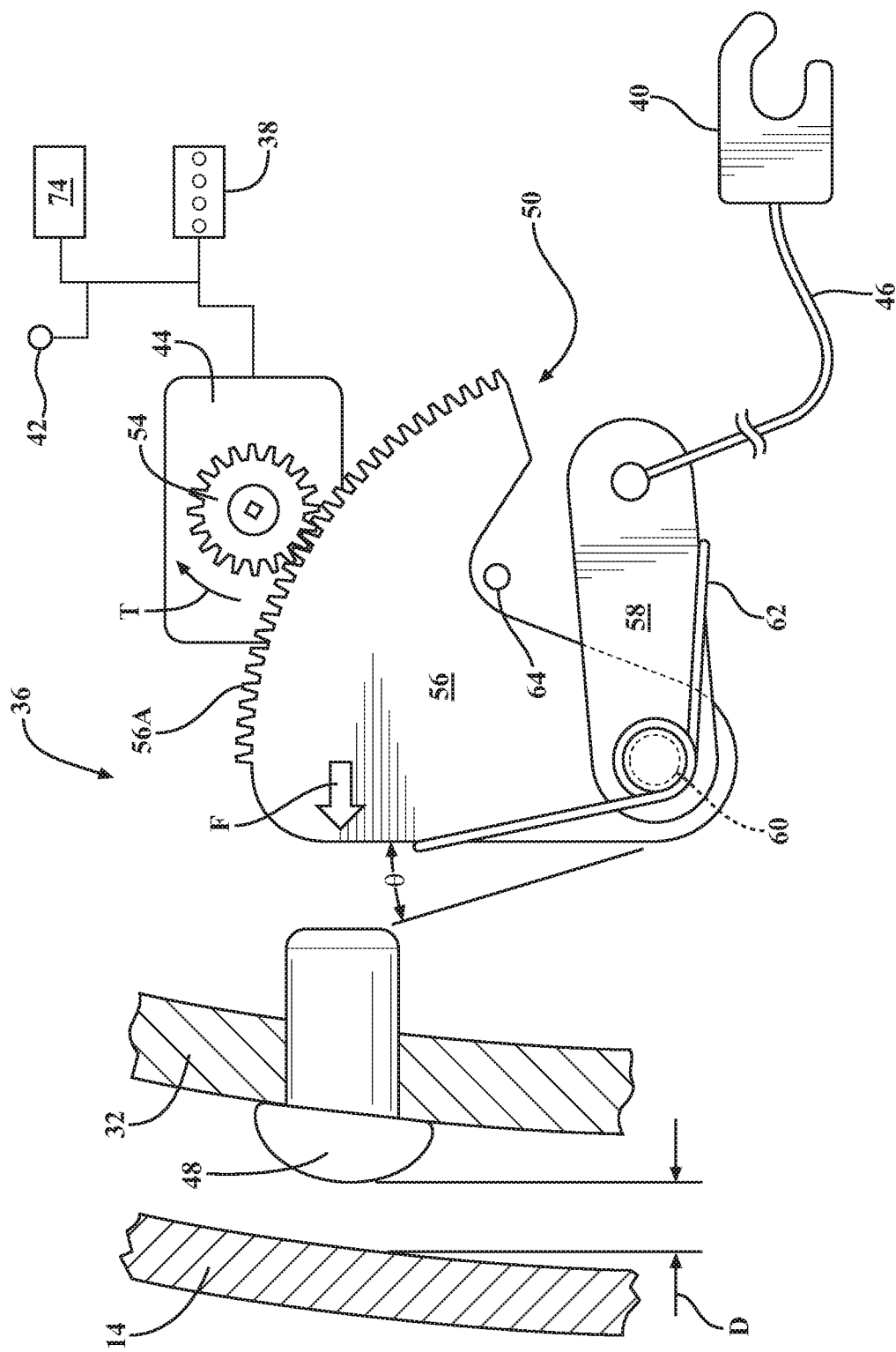
FIG. 4 is a close-up schematic view of the system for controlling access into the vehicle showing a mechanism configured to sequentially actuate a door latch cable and a door presenter having one embodiment of the mechanism, according to the disclosure.

The vehicle 10 also includes a system 36 for controlling access into the subject vehicle 10. The system 36 includes an energy storage device 38 (shown in FIG. 1), such as a battery, for generating electrical power used to operate various vehicle systems, such as powertrain, lighting, and heating, ventilation, and air conditioning (HVAC). As shown in FIG. 4, the system 36 also includes a latch 40 for each of the access doors 32. Each latch 40 is configured to selectively fasten the access door 32 to the vehicle body 14 and release the access door therefrom. As shown in FIGS. 1 and 4, the system 36 may also include a number of release switches 42, each such switch in electrical communication with a respective latch 40 and the energy storage device 38. The release switch 42 may be arranged on a respective access door 32 or proximate the subject access door on the exterior 26 of the vehicle body 14.

The system 36 also includes an electric motor 44 mounted on the access door 32 and in electrical connection with the energy storage device 38. The release switch 42 is configured to activate the electric motor 44 and thereby operate the latch 40. Accordingly, each latch 40 is power operated to facilitate access to the respective access opening 30 via the access door 32 by using the electrical power generated by the energy storage device 38. The release switch 42 may be configured as a pushbutton, a haptic sensor, or another appropriate device conveniently positioned for access by a vehicle's operator or passenger. As shown, each access door 32 includes a door hem 32A having an operator contact pad 32B providing a convenient surface for the vehicle operator or passenger to manually pull the access door open for gaining access to the passenger compartment 28A. The release switch 42 and the contact pad 32B together are intended to function as, and take place of a traditional door handle. Accordingly, the system 36 dispenses with the need for a traditional door handle arranged on the exterior 26 of the access door 32. Therefore, as shown, the vehicle 10 is characterized by the absence of a traditional door handle on the exterior 26 of the vehicle.

As shown in FIG. 4, the system 36 additionally includes a cable 46, a door presenter 48, and a mechanism 50, each of which may be arranged and mounted on the access door 32. The cable 46 is configured to operate the latch 40 and thereby release the access door 32 from the vehicle body 14 for access into the vehicle interior 28. The door presenter 48 is configured to push and move or shift the access door 32 away from the vehicle body 14 by a predefined distance D. The distance D is configured to facilitate sufficient access to the operator contact pad 32B on the door hem 32A. Such movement of the access door 32 upon actuation of the release switch 42 is intended to present the door, and specifically the contact pad 32B, to the operator of the vehicle 10. The mechanism 50 is configured to sequentially actuate the cable 46 and the door presenter 48. As shown, the electric motor 44 is mounted remotely from the latch 40 and configured to power the mechanism 50, such that the access door 32 is shifted away from the vehicle body 14 by the door presenter 48 after the access door is released.

As shown, the electric motor 44 generates a motor torque T and outputs the torque via a gear 54. The mechanism 50 may include a first lever 56 and a second lever 58 configured to swing or rotate about a common pivot point P defined by a pivot shaft 60. As shown, the first lever 56 includes a toothed surface 56A in meshed connection with the gear 54. The first lever 56 is configured to swing through an arc $\theta$ and transfer the motor torque T into an applied force F to actuate or drive the door presenter 48. The second lever 58 is configured to actuate the cable 46 and thereby operate the latch 40 to release the access door 32. The mechanism 50 may additionally include an elastic element 62 arranged operatively between the first lever 56 and the second lever 58. The elastic element 62 is configured to preload the first lever 56 against the second lever 58 and permit independent motion of the first lever relative to the second lever after the release of the latch 40. As shown, the elastic element 62 may be a torsion spring centered on the pivot shaft 60. Such a torsion spring 62 is specifically configured to permit the first lever 56 to actuate the door presenter 48 after the release of the latch 40 by the second lever 58. Accordingly, a single electric motor 44 is required and employed for operating the system 16 at each respective access door 32. Such use of one electric motor 44 to both release the latch 40 and shift the door 32 results in reduction of cost and mass of the system 36.

With continued reference to FIG. 4, the mechanism 50 may additionally include a stop feature 64. The stop feature 64 is intended to be used with the elastic element 62, and configured to limit travel of the second lever 58 after the release of the latch 40. Specifically, due to the preload from the elastic element 62, when subjected to the electric motor torque T, the first and second levers 56, 58 may swing substantially in unison about the pivot P until the second lever 58 contacts the stop feature 64. Once the latch 40 is released by the cable 46, within a relatively short amount of additional rotation the second lever 58 contacts the stop feature 64 and ceases to rotate. However, owing to the elastic connection between the first lever 56 and the second lever 58 through the elastic element 62, the first lever may continue rotating against the elastic element, and apply the force F to actuate the door presenter 48.

Figure 5:
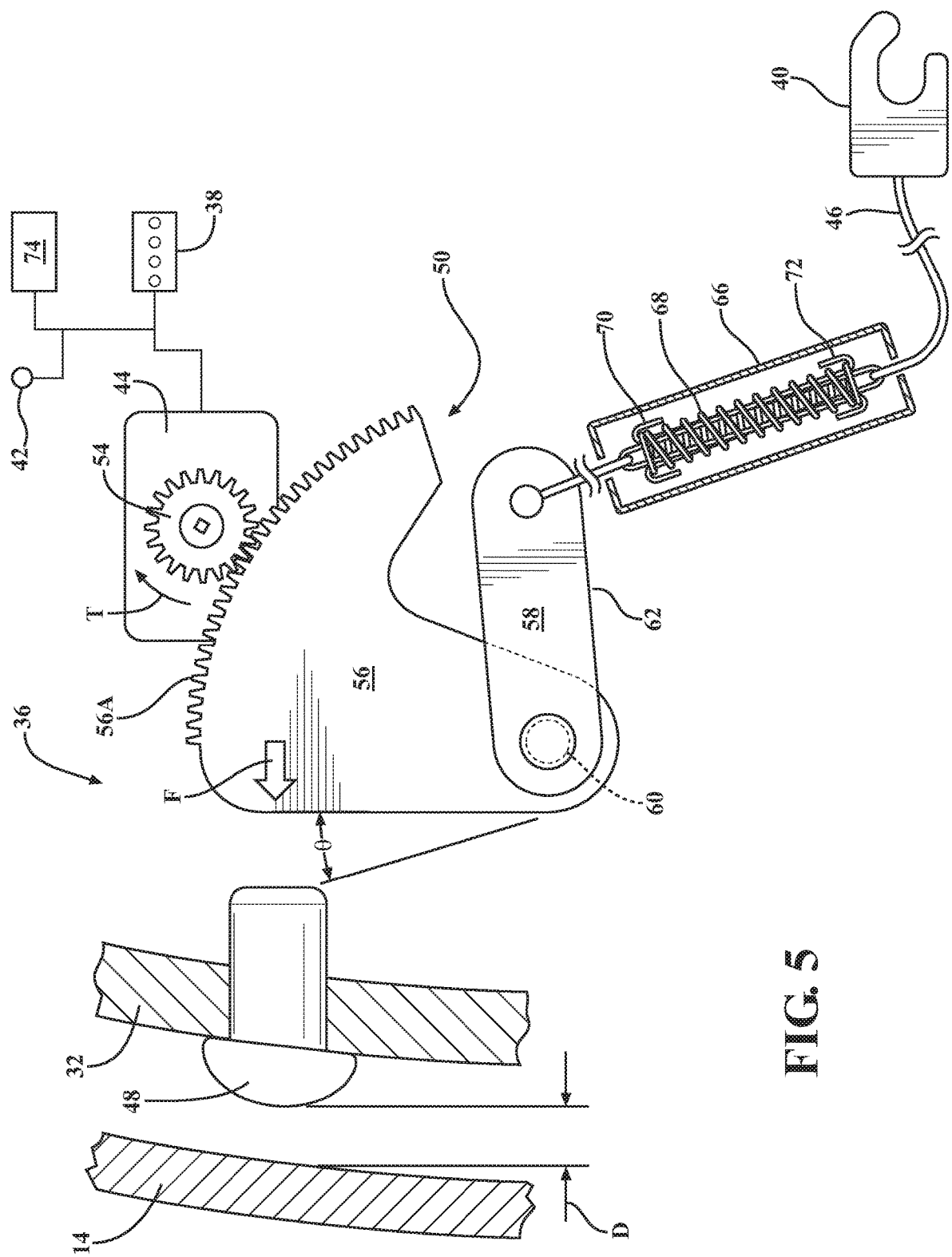
FIG. 5 is a close-up schematic view of the system for controlling access into the vehicle having a mechanism configured to sequentially actuate a door latch cable and a door presenter having another embodiment of the mechanism, according to the disclosure.
Figure 6:
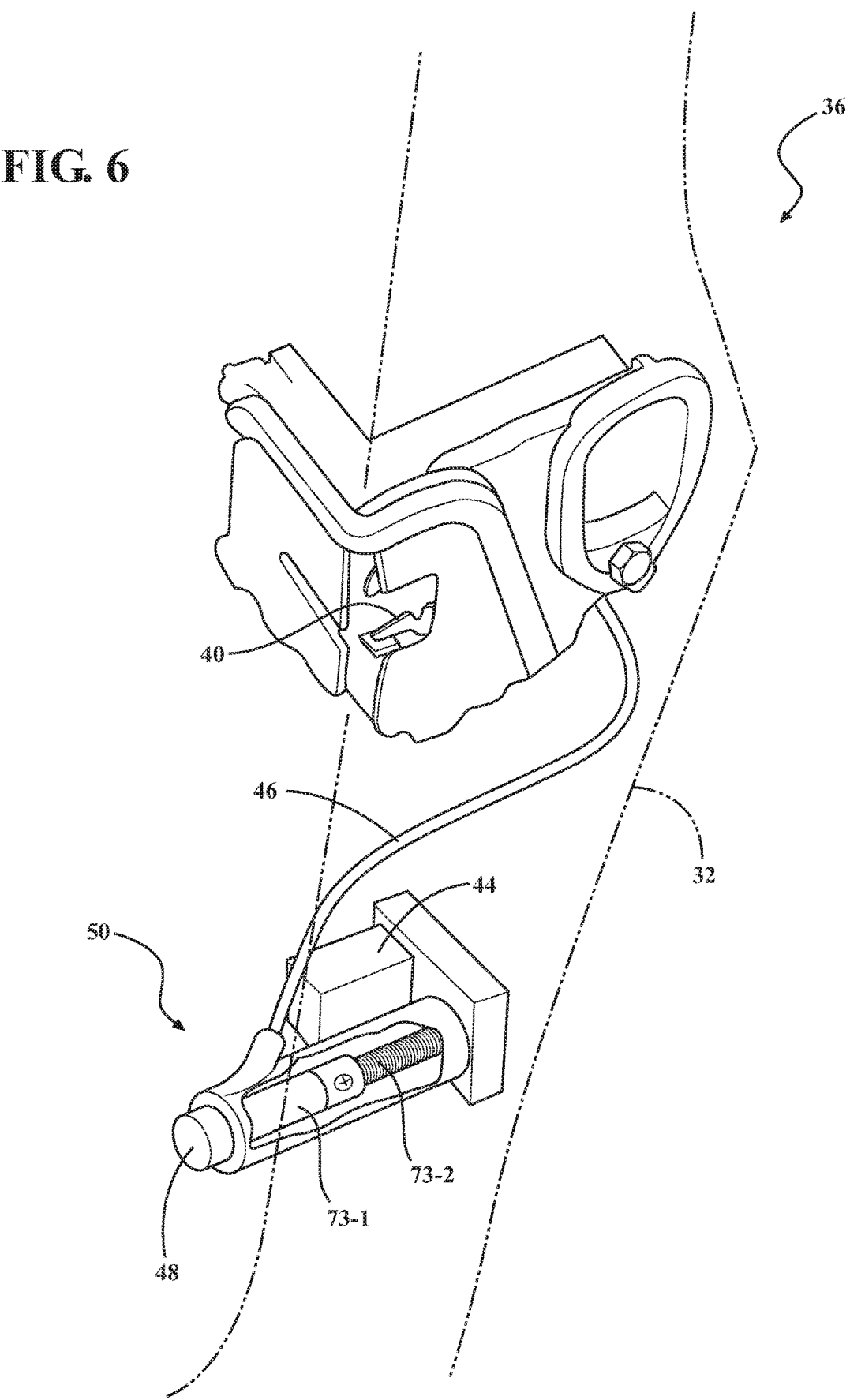
FIG. 6 is a close-up schematic perspective partial view of the system for controlling access into the vehicle showing a partially cut-away view of an embodiment of the mechanism configured to sequentially actuate the door latch cable and the door presenter, according to the disclosure.

In a separate embodiment, as shown in FIG. 5, and in place of the elastic element 62, the cable 46 may include an over-travel compensator 66 configured to permit the mechanism 50 to actuate the door presenter 48 after the release of the latch 40. Such construction of the cable 46 would permit the first and second levers 56, 58 to be fixed to one another and swing in unison about the pivot P. The construction of such an over-travel compensator 66 may be configured as a drawbar spring. As shown, the drawbar spring generally includes a coil spring 68 captured between two brackets 70, 72 arranged to compress the coil spring when the cable 46 is in tension. The coil spring 68 undergoes significant compression when tension in the cable 46 exceeds a specific value, thereby permitting the effective length of the cable to increase. The tension in the cable 46 will generally exceed such a value when the latch 40 reaches the end of its travel after having been fully released. In the context of the cable 46, the usage of the over-travel compensator 66 permits the second lever 58 to continue rotation with the first lever 56 after the latch 40 is released. Alternatively, the mechanism 50 may employ an actuator 73-1 operatively connected to the electric motor 44 via a ball screw 73-2 (shown in FIG. 6), and configured to pull the cable 46, to thereby release the latch 40, and subsequently actuate the door presenter 48.

As shown in FIG. 1, the system 36 may additionally include an electronic controller 74 in operative communication with the release switch 42, the electric motor 44, and the energy storage device 38. The controller 74 may be a stand-alone unit, or be part of an electronic control unit (ECU) that regulates operation of the vehicle's various systems, such as powertrain, lighting, and heating, ventilation, and air conditioning (HVAC). The controller 74 is arranged on the vehicle 10 and includes a processor and a readily accessible non-transitory memory. Instructions for controlling operation of the system 36 are programmed or recorded in the memory of the controller 74 and the processor is configured to execute the instructions from the memory during operation of the vehicle 10. The controller 74 is also in electronic communication with the release switch 42, and is generally programmed to regulate operation of the electric motor 44 in response to actuation of the release switch by the operator of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling access into a vehicle having a vehicle body defining a vehicle interior, a vehicle exterior, and an access opening, and an access door configured to selectively cover and uncover at least a portion of the access opening, the system comprising:
    a latch configured to selectively fasten the access door to the vehicle body and release the access door therefrom;
    a cable configured to operate the latch and thereby release the access door from the vehicle body;
    a door presenter configured to shift the access door away from the vehicle body;
    a mechanism configured to sequentially actuate the cable and the door presenter, wherein:
        the mechanism includes a first lever and a second lever configured to swing about a common pivot defined by a pivot shaft;
        the first lever is in meshed connection with the electric motor and configured to actuate the door presenter; and
        the second lever is configured to actuate the cable; and
    an electric motor configured to power the mechanism such that the access door is shifted away from the vehicle body by the door presenter after the access door is released.

2. The system according to claim 1, further comprising:
    an energy storage device configured to generate electrical power; and
    a release switch, in electrical communication with the latch and the energy storage device, and configured to activate the electric motor.

3. The system according to claim 2, further comprising an electronic controller in operative communication with the release switch, the electric motor, and the energy storage device, and configured to regulate operation of the electric motor in response to actuation of the release switch.

4. The system according to claim 1, wherein the mechanism additionally includes an elastic element configured to preload the first lever against the second lever and permit independent motion of the first lever relative to the second lever after the release of the latch.

5. The system according to claim 4, wherein the elastic element is a torsion spring centered on the pivot shaft and configured to permit the first lever to actuate the door presenter after the release of the latch by the second lever.

6. The system according to claim 1, wherein the mechanism additionally includes a stop feature configured to limit travel of the second lever after the release of the latch.

7. The system according to claim 1, wherein the access door includes a door hem having an operator contact pad providing a surface for pulling the access door open.

8. The system according to claim 1, wherein each of the latch, the cable, the door presenter, the mechanism, and the electric motor is arranged on the access door.

9. The system according to claim 1, wherein the access opening is one of a side entry configured to provide access to the vehicle interior and an opening to a cargo area.

10. A vehicle comprising:
    a vehicle body defining a vehicle interior, a vehicle exterior, and an access opening;

an access door configured to selectively cover and uncover at least a portion of the access opening; and a system for controlling access into the vehicle, the system comprising:

a latch configured to selectively fasten the access door to the vehicle body and release the access door therefrom;

a cable configured to operate the latch and thereby release the access door from the vehicle body;

a door presenter configured to shift the access door away from the vehicle body;

a mechanism configured to sequentially actuate the cable and the door presenter, wherein:

the mechanism includes a first lever and a second lever configured to swing about a common pivot defined by a pivot shaft;

the first lever is in meshed connection with the electric motor and configured to actuate the door presenter; and the second lever is configured to actuate the cable; and an electric motor configured to power the mechanism such that the access door is shifted away from the vehicle body by the door presenter after the access door is released.

11. The vehicle according to claim 10, wherein the system additionally includes:

an energy storage device configured to generate electrical power; and a release switch, in electrical communication with the latch and the energy storage device, and configured to activate the electric motor.

12. The vehicle according to claim 11, wherein the system additionally includes an electronic controller in operative communication with the release switch, the electric motor, and the energy storage device, and configured to regulate operation of the electric motor in response to actuation of the release switch.

13. The vehicle according to claim 10, wherein the mechanism additionally includes an elastic element configured to preload the first lever against the second lever and permit independent motion of the first lever relative to the second lever after the release of the latch.

14. The vehicle according to claim 13, wherein the elastic element is a torsion spring centered on the pivot shaft and configured to permit the first lever to actuate the door presenter after the release of the latch by the second lever.

15. The vehicle according to claim 10, wherein the mechanism additionally includes a stop feature configured to limit travel of the second lever after the release of the latch.

16. The vehicle according to claim 10, wherein the access door includes a door hem having an operator contact pad providing a surface for pulling the access door open.

17. The vehicle according to claim 10, wherein each of the latch, the cable, the door presenter, the mechanism, and the electric motor is arranged on the access door.

18. The vehicle according to claim 10, wherein the access opening is one of a side entry configured to provide access to the vehicle interior and an opening to a cargo area.

* * * * *